Patented Dec. 25, 1951

2,579,543

UNITED STATES PATENT OFFICE 2,579,543

LIGHT FILTER

Wallace R. Brode and Robert J. Morris, Columbus, Ohio, assignors to Ohio State University Research Foundation, Columbus, Ohio No Drawing. Application October 1, 1945, Serial No. 619,688

9 Claims. (Cl. 88—109)

This invention relates to compositions useful as filters and to methods of producing such compositions and filters. It is particularly concerned with compositions useful as filters for preventing the transmission of selected light radiations and to the methods of producing such compositions and completed filters.

Heretofore light filters or color screens have been produced by mixing inorganic dyes with a glass batch to form a colored glass but these prior art filters do not sharply divide the radiations of desired wave-lengths from those of undesired wave-lengths nor was it possible thereby to filter out the visible radiations while allowing the passage of certain desired visible radiations. Also heretofore many of the dyes used by us have been utilized to color certain opaque materials such as paper or cloth, but obviously such uses were of no value for allowing the passage of preselected longer wave length radiations. Finally filters have heretofore been proposed in which an organic dye is dissolved in or impregnated on certain organic compounds but these either have not been sufficiently weather resistant, or so far as we know are not sufficiently selective.

It is therefore one object of this invention to provide a filter for light rays which will selectively prevent the transmission of certain radiations while allowing the transmission of other radiations of predetermined wave lengths therethrough.

In carrying out the above in certain preferred embodiments, we use a resin or a mixture of resins which resin or mixture acts as a carrier for a spirit soluble, light filtering dye, said resin or mixture consisting of a resin or a plurality of resins selected from the group consisting of the melamine formaldehyde resins, urea formaldehyde resins, and polyalcoholphthalic anhydride ester resins.

A still further object of the invention is to provide filtering mediums capable of selectively filtering out substantially all radiations having wave-lengths shorter or longer than selected determined wave-lengths whereby all or a part of the undesired portion of the spectrum may be screened out.

Prior hereto it had been considered not only that it was very difficult to create a serviceable bond between glass and any other filtering material, but also that it was impossible to form a substantially permanent bond between glass and the dyes which we use or any organic dyes; for the reason that such compounds usually do not form a permanent bond with glass. Happily we discovered that the mixtures of a resin or resins and spirit soluble dyes hereinafter described not only would filter out radiations of undesired wave-length selectively but would adhere firmly to glass and when so bonded to glass, such mixtures provide a filter which is practically permanent in its resistance to weather.

Further objects will appear from a consideration of the following description wherein preferred embodiments of the invention are clearly set forth.

This invention has been used with great success by us heretofore for the purpose of filtering radiations having wave-lengths within the visible spectrum. However, in some cases, the screening out of ultra-violet light is desired. To this end the invention disclosed herein may be used in certain specific embodiments to prevent the transmission of all or a portion of the invisible ultra-violet light, thus for example, filtering out substantially all of the radiations having wave-lengths shorter than 0.4 micron while allowing the transmission of substantially all of the visible and infra-red radiations.

The medium used for the selective filtering of light rays is a resin base which carries a light filtering dye dissolved (or possibly uniformly dispersed) therethrough. This medium may be supported and carried by glass, quartz, plastic or other suitably transparent medium or it may take the form of a thin flexible sheet. In any case the filtering action is the same. While we have not tested the mixture by X-ray defraction, no scattering of light or Tyndall cone is perceptible therein.

The resin base may be a single resin but is preferably a mixture of two resins, one of which is a melamine-formaldehyde resin. Thus melamine-formaldehyde resin may be mixed with a polyalcohol-phthalic anhydride ester resin, which may for example be the reaction product of phthalic anhydride and glycerol. Also the ester may have small additions of a drying oil mixed with it in some cases. In place of this ester, we may mix a urea-formaldehyde resin with a melamine-formaldehyde resin. Replacing the melamine-formaldehyde resin, we may mix a urea-formaldehyde resin with a polyalcohol-phthalic anhydride ester resin.

This resin base forms a more or less flexible carrier for a spirit soluble dye which controls the screening properties of the filter to be described hereinafter. The percentages of the resin determine the characteristics of the carrier, for example, high percentages of a melamine-formaldehyde resin or urea-formaldehyde resin tend to make the carrier brittle, while high percentages of a polyalcohol-phthalic anhydride ester resin make a more pliable and resilient base.

This base carries the light filtering dye. The dye is used in varying quantities according to results desired. By varying the quantity of dye, the filtering range can be controlled so as to allow the passage of radiations by steps from within the ultra-violet into the near infra-red while filtering out radiations having shorter wave-lengths. The specific quantities are best arrived at by trial of each specific dye for the specific results desired although we have found that the percentage of dye will usually vary between 1% and 4% for best results.

Any dye which is spirit soluble may be used in such concentrations. However, we prefer to use dyes which when incorporated in our improved filter divide sharply the wave-lengths which are to be filtered out from those that are to be allowed to pass so that substantially all radiations below a certain wave-length are filtered out while substantially all of those above are transmitted. We have found that complex organic dye derivatives of diorthotolylguanidine, diphenylguanidine and diorthoxylguanidine such as diazo, disazo and trisazo dye complexes including dyes manufactured by E. I. du Pont de Nemours and Co. and sold under the trade name of Luxol Fast Black L, Luxol Fast Blue G, Luxol Fast Green B, Luxol Fast Red B, Luxol Fast Orange R, Luxol Fast Yellow T, are especially effective for certain desirable filtering action.

In formulating the filtering material by our improved method, the finely ground dye is added to the resin or mixture resins with a sufficient amount of a suitable solvent (such as butyl alcohol, methyl Cellosolve, or xylene) to make a smooth mixture of suitable fluidity and is mixed by suitable means such as for example by a conventional electric stirrer. After thorough mixing, the material should preferably be of a fluidity that will permit smooth even flow when poured onto the supporting plate which may in certain instances be transparent. The thickness of the layer is obviously controlled by the fluidity but is of no great importance. It is preferred however that the material flow evenly to the edges of the support.

If the filter is to be bonded to a glass support, the resin-dye mixture, after being poured onto a glass plate, is permitted to air dry and harden. This usually requires a period of from 6 to 12 hours depending on the thickness of the layer. The final curing is effected by baking the air dried film at temperatures between 80° C. and 100° C. In this connection, the use of an accelerator, while not essential may be preferred to hasten the drying. The addition of a suitable drying accelerator may be made, if desired, in quantities of from 1% to 3% to the mixture. Commercial peroxide accelerators may be used, as may other accelerators which are well known in the art.

When the resin is stored in quantities it may also be desirable to add from ½ of 1% to 1% of an anti-skinning agent such as guaiacol, or other phenolic compounds, to prevent skinning. Here again, if fresh batches of material are used, such expedient is not necessary although it does facilitate operations with the resins.

We prefer to use a glass support for the filter When a glass support is used, we have at times found it desirable to sand blast the surface of the glass to increase adherence of the filtering material. While the sandblasting may increase the scattering effect of the sand blasted glass to about 80%, the refractive index of the film is sufficiently close to that of glass that after the glass is treated by our process, scattering is reduced to that of the original glass and becomes negligible. In cases where no support is to be used in the completed filter, the dried filter layer may be first applied to and then peeled off from a suitable base such as a methyl methacrylate plastic which is used only as a drying support.

We give the following specific examples of the practice of our invention showing the results possible with out filters, it being understood that all percentages are by weight:

Example I

We mixed 70% of a melamine-formaldehyde resin manufactured by the American Cyanamid Company and sold under the trade name of Melmac #599-8 with 30% of a polyalcohol-phthalic anhydride ester resin manufactured by American Cyanamid Company and sold under the trade name of Rezyl #330-5.

A diorthotolylguanidine dye complex manufactured by E. I. du Pont de Nemours and Co. and sold under the trade name of Luxol Fast Blue G was finely ground and 3.2% of such finely ground dye was added to the resin mixture together with a sufficient amount of xylene and methyl Cellosolve to make a smooth mixture which was capable of flowing evenly. Luxol Fast Blue G is the diorthotolylguanidine salt of Pontamine Fast Blue 4GL which has the Colour Index No. 533. Approximately 1% of guaiacol was added. This mixture was thoroughly stirred by a conventional electric stirrer. After thorough mixing, the mixture was poured onto a glass plate where it flowed evenly to the edges of the plate forming an even layer or film. This layer was permitted to air dry and harden for about 12 hours. The plate and film were baked at a temperature of about 100° C. for 6 hours. It was found that the film was bonded firmly to the glass plate.

The glass plate with the film adhering thereto was found to prevent the passage of substantially all light rays having a wave-length shorter than 0.76 micron wave-length while allowing the passage of substantially all light rays having a wave-length longer than 0.78 micron, the average dividing line thus being approximately 0.77 micron, thus preventing the passage of substantially all of the visible light rays while allowing the passage of substantially all of the infra red rays. On test for weathering, it was found to withstand the attacks of weather exceptionally. It had a relatively hard finish.

Example II

We followed exactly the same procedure but using 60% of Melmac #599-8 with 40% of Rezyl #330-5 instead of the 70%-30% mixture. The results were substantially the same except that the finish was not quite so hard and the weathering characteristics were improved.

Example III

We followed exactly the same procedure as in Example I but using 50% of Melmac #599-8 with 50% of Rezyl #330-5 instead of the 70%-30% mixture. The results were substantially the same except that the finish was less hard even than the finish of Example II. The weathering characteristics were substantially the same as those of the plate tested under Example II, the weathering characteristics of the plates where a mixture of 50% Melmac and 50% Rezyl was used and where a mixture of 60% Melmac and 40% Rezyl was used being the best of any observed in our tests.

*Example IV*

We followed the same procedure as in Example I but using 40% of Melmac #599-8 with 60% of Rezyl #330-5 instead of the 70%-30% mixture. The results were substantially the same except that the finish was more plastic and pliable than that of Example III. The weathering characteristics were still exceptional.

*Example V*

We followed the same procedure as in Example I but using 30% of Melmac #599-8 with 70% of Rezyl #330-5 instead of the 70%-30% mixture. The results were substantially the same except that the finish was even more plastic and pliable than the finish of Example IV. The weathering characteristics were very good.

*Example VI*

We followed the same procedure as in Example III using however a urea formaldehyde resin manufactured by American Cyanamid Company and sold under the trade name of Beetle #230-8 instead of Melmac #599-8. The results were substantially the same as those observed in Example III, except as to weathering.

*Example VII*

We followed the same procedure as in Example III using, however, the urea formaldehyde resin (Beetle #230-8) referred to in Example VI instead of the Rezyl #330-5. The results were very similar to those of Example III except that the finish was very hard.

*Example VIII*

We followed the same procedure as in Example III using, however, 2.5% of finely ground Luxol Fast Blue G dye. The result was substantially the same except that the dividing line between the rays which were transmitted and those which were filtered out was shifted to a wave-length of 0.76 micron, which wave length is substantially on the dividing line between the length of the infra red rays and the length of the visible rays.

*Example IX*

We followed the same procedure as in Example III using, however, 1.4% of the finely ground Luxol Fast Blue G dye. The result was substantially the same except that the dividing line between the rays which were transmitted and those which were filtered out was shifted to a wave length of 0.75 micron, which wave length is also substantially on the dividing line between the wave length of infra red rays and the wave length of visible rays.

*Example X*

We followed the same procedure as in Example III except that prior to flowing the resin dye mixture onto the glass plate, we sand blasted the plate which was found to disperse about 80% of the visible light rays passing through. After flowing the mixture onto the sheet, drying the film, and baking it, we found that not only the results were substantially the same as in Example III relative to filtering, weathering and finish qualities but the qualities of the smooth glass (as it was prior to sand blasting) for absence of dispersion were substantially restored.

*Example XI*

We followed the same procedure as in Example III except that instead of flowing the resin dye mixture onto glass, we flowed it onto a sheet of methyl methacrylate plastic. When dried and baked, the film of the resin dye mixture could be peeled off and formed a flexible filter of characteristics similar to those of the filter formed by Example III.

*Example XII*

We followed the same procedure as in Example III except that instead of the dye complex there used, we used a diphenyl guanidine dye complex. The results were similar.

*Example XIII*

We followed the same procedure as in Example III except that instead of the dye complex there used, we used a diorthoxylylguanidine dye complex. The results were similar.

*Examples XIV, XV, XVI, XVII, XVIII*

We followed the same procedures as in Example III except that instead of the dye complex there used, we used, respectively, Luxol Fast Black L, Luxol Fast Green B, Luxol Fast Red B, Luxol Fast Orange R, and Luxol Fast Yellow T. The above dyes are diorthotolylguanidine salts of respectively, Pontamine Fast Black L, having Colour Index No. prototype 24; Naphthol Green B, having the Colour Index No. 5; Pontamine Fast Red, 8BL, having the Colour Index No. 278; Orange R, having the Colour Index No. 161; and Tartrazine O, having the Colour Index No. 640. The results were similar to the results in Example III, except that the dividing line between the rays which were transmitted and those which were transmitted was shifted for each type of dye used; the shift in such dividing line being relatively large in the case of a change in the color of the dye relative to the shifts mentioned above in connection with Examples VIII and IX.

*Example XIX*

We followed the same procedure as in Examples I-XVIII inclusive, using, however, Melmac #599-8 alone instead of a mixture of resins. The mixture with the dye bonded very well with the glass plate and formed an efficient filter. However, this film did not weather well.

*Example XX*

We followed the same procedure as in Example I using Beetle #230-8 alone in place of the mixture of resins used in Example I-XVIII, inclusive. The mixture with the dye bonded very satisfactorily with glass plates and formed a satisfactory filter. However, this film did not stand weather tests well.

*Example XXI*

We attempted to follow the same procedure using Rezyl #330-5 alone in place of a mixture of resins. We were unable to get the mixture of this resin with the dye to dry satisfactorily.

It is apparent, from the foregoing, that the important ingredients in the filter material are the resin or resin mixture and the dye. The quantities of these ingredients may vary to provide varying results in accordance with the proposed use. Glass supports may or may not be used at the discretion of the user.

While the embodiments of the present invention as herein disclosed constitute preferred forms, it is to be understood that the examples are merely illustrative and that other forms than either the examples or the general embodiments disclosed, might be adopted, if coming within the scope of the claims which follow.

What is claimed is as follows:

1. A filter for selectively transmitting radiations having predetermined wave-lengths comprising; a transparent support having bonded thereto a resin base, carrying from 1% to 4% by weight of a spirit soluble diorthotolylguanidine salt derivative of an organic dye selected from the group consisting of dyes having Colour Indexes No. 5, No. 161, No. 278, No. 533 and No. 640 and of Pontamine Fast Black L dye thoroughly dispersed therethrough, said resin base consisting of from 30 to 70 parts melamineformaldehyde resin and from 70 to 30 parts of a resin consisting of the reaction product of phthalic anhydride and glycerol.

2. A filter for selectively transmitting radiations having predetermined wave lengths comprising a transparent support having bonded thereto a resin base, carrying from 1% to 4% by weight of a diorthotolyl guanidine salt derivative of a dye having the Colour Index No. 533 thoroughly dispersed therethrough, said resin base consisting of from 30 to 70 parts by weight of melamine formaldehyde resin and from 70 to 30 parts of a resin consisting of the reaction product of phthalic anhydride and glycerol.

3. A filter for selectively transmitting radiations having predetermined wave lengths comprising a transparent support having bonded thereto a resin base carrying thoroughly dispersed therethrough from 1% to 4% by weight of a diorthotolyl guanidine salt derivative of a dye having the Colour Index No. 533, said resin base consisting of a mixture of from 30 to 70 parts by weight of a resin selected from the class consisting of melamine formaldehyde resins, urea formaldehyde resins, and a resin consisting of the reaction product of phthalic anhydride and glycerol and from 70 to 30 parts of another resin selected from said group.

4. A filter for selectively transmitting radiations having predetermined wave lengths comprising a transparent support having bonded thereto a resin base carrying thoroughly dispersed therethrough from 1% to 4% by weight of a diorthotolyl guanidine salt of a dye having the Colour Index No. 533, said resin base consisting of a mixture of a melamine formaldehyde resin and a resin consisting of the reaction product of phthalic anhydride and glycerol.

5. A filter for selectively transmitting radiations having predetermined wave lengths comprising a transparent support having bonded thereto a resin base carrying thoroughly dispersed therethrough a diorthotolyl guanidine salt derivative of a dye having the Colour Index No. 533, said resin base consisting of a mixture of melamine formaldehyde resin and a resin consisting of a reaction product of phthalic anhydride and glycerol.

6. A filter for selectively transmitting radiations having predetermined wave lengths within the infra red range comprising a transparent support having bonded thereto a resin base carrying thoroughly dispersed therethrough a light filtering, spirit soluble guanidine salt derivative of a dye having Colour Index No. 533, which dye is capable of absorbing all of the rays of the visible spectrum and is capable of screening out and allowing the passage of infra red radiations having wave lengths within said predetermined range, said resin base consisting of a mixture of a resin selected from the class consisting of melamine formaldehyde resins, urea formaldehyde resins, and a resin consisting of a reaction product of phthalic anhydride and glycerol with another resin selected from said group and said spirit soluble guanidine salt derivative of the dye being selected from the group consisting of the diorthotolylguanidine salt derivative, the diphenylguanidine salt derivative and the diorthoxylylguanidine salt derivative of said dye having Colour Index No. 533.

7. A filter for selectively transmitting radiations having predetermined wave lengths comprising a transparent support having bonded thereto a resin base carrying thoroughly dispersed therethrough a diorthotolyl guanidine salt derivative of a dye having the Colour Index No. 533, said resin base consisting of a mixture of a resin selected from the class consisting of melamine formaldehyde resins, urea formaldehyde resins, and a resin consisting of the reaction product of phthalic and glycerol with another resin selected from said group.

8. A filter for selectively transmitting radiations having predetermined wave lengths, comprising a transparent support having bonded thereto a resin base carrying thoroughly dispersed therethrough about 3% by weight of a diorthotolyl guanidine salt derivative of a dye having the Colour Index No. 533, said resin base consisting of from 50 to 60 parts by weight of a melamine formaldehyde resin and from 40 to 50 parts of a resin consisting of the reaction product of phthalic anhydride and glycerol.

9. A filter for selectively transmitting radiations having predetermined wave lengths comprising a transparent support having bonded thereto a resin base, carrying about 3% by weight of a diorthotolyl guanidine salt derivative of a dye having the Colour Index No. 533, thoroughly dispersed therethrough, said resin base consisting of from 30 to 70 parts by weight of melamine formaldehyde resins, and from 70 to 30 parts of a resin consisting of the reaction product of phthalic anhydride and glycerol.

WALLACE R. BRODE.
ROBERT J. MORRIS.

REFERENCES CITED

The following references are of record in the file of this patent:

UNITED STATES PATENTS

| Number | Name | Date |
| --- | --- | --- |
| 1,025,677 | Brunet | May 7, 1912 |
| 1,836,914 | Gardner | Dec. 15, 1931 |
| 2,034,987 | Morita | Mar. 24, 1936 |
| 2,062,179 | Hunter | Nov. 24, 1936 |
| 2,113,973 | Addink | Apr. 12, 1938 |
| 2,160,907 | Richardson | June 6, 1939 |
| 2,194,115 | Ferguson | Mar. 19, 1940 |
| 2,197,357 | Widmer et al. | Apr. 16, 1940 |
| 2,197,442 | Widmer | Apr. 16, 1940 |
| 2,241,239 | Carroll et al. | May 6, 1941 |
| 2,304,754 | Wainer | Dec. 8, 1942 |
| 2,332,958 | West | Oct. 26, 1943 |
| 2,343,997 | Powell et al. | Mar. 14, 1944 |
| 2,351,602 | Dalelio | June 20, 1944 |
| 2,356,849 | Horback | Aug. 29, 1944 |
| 2,370,244 | Jacobs | Feb. 27, 1945 |
| 2,418,605 | Shepherd et al. | Apr. 8, 1947 |